United States Patent [19]

Simmonds

[11] E Patent Number: Re. 31,728

[45] Reissued Date of Patent: Nov. 6, 1984

[54] TEST SET

[75] Inventor: James F. Simmonds, Woodland Hills, Calif.

[73] Assignee: Perkins Research & Manufacturing Co., Canoga Park, Calif.

[21] Appl. No.: 344,228

[22] Filed: Jan. 28, 1982 (Under 37 CFR 1.47)

Related U.S. Patent Documents

Reissue of:

[64] Patent No.: 4,186,283
Issued: Jan. 29, 1980
Appl. No.: 908,055
Filed: May 22, 1978

[51] Int. Cl.[3] ..... H04M 1/24

[52] U.S. Cl. ..... 179/175.3 R; 179/175.3 A; 179/175.25

[58] Field of Search ..... 179/175.25, 175.3 A, 179/175.3 F, 175.3 R, 175.3 S, 175; 324/51, 52, 66, 67, 114, 133; 307/237

[56] References Cited

U.S. PATENT DOCUMENTS

| | | | |
|---|---|---|---|
| 3,010,067 | 11/1961 | Evans | 324/114 |
| 3,084,232 | 4/1963 | Buhler | 179/175 |
| 3,699,274 | 10/1972 | Bennett | 179/175 |
| 3,941,950 | 3/1976 | Dunwoodie et al. | 179/175.3 R |
| 3,975,600 | 8/1976 | Marston et al. | 179/175.25 |
| 3,976,849 | 8/1976 | Champan | 179/175.3 R |
| 4,277,740 | 7/1981 | Parks | 179/175.3 A |

*Primary Examiner*—Gerald L. Brigance
*Attorney, Agent, or Firm*—Poms, Smith, Lande & Rose

[57] ABSTRACT

A portable test set is disclosed for rapid pair identification, polarity determination, and half-tap verification in conjunction with modular testing apparatus employed in splicing cables—particularly cables used in the telephone industry for interconnecting telephone switching systems and subscriber equipment. Switchable meters operating in combination as a single indicator are provided for determining individual line pair conditions prior to execution of simultaneous multiple pair splicing operations to prevent customer inconvenience or loss of service. The test set is adapted for mating with contemporary modular splicing equipment through the interface typically provided therein. The test set is particularly characterized by incorporating no internal power supply as is the usual case in such equipment but, rather, operating totally from voltages present in the cables under test.

83 Claims, 9 Drawing Figures

TEST SET

Matter enclosed in heavy brackets [ ] appears in the original patent but forms no part of this reissue specification; matter printed in italics indicates the additions made by reissue.

BACKGROUND OF THE INVENTION

The present invention relates to electrical test apparatus and, more particularly, to apparatus for identifying and testing individual electrical conductors in a bundle of unidentified conductors.

Apparatus for identifying electrical [connectors] *conductors* within a group of electrical [connectors] *conductors* either intentionally or unintentionally (shorted) electrically interconnected at a remote location is not new. For example the simple "bell and battery" of FIG. 7 is well known and well used in the electrical arts. Given a pair of cables 150 and 152 comprising a plurality of insulated electrical conductors 154 and 156, respectively, any electrical interconnection between a conductor 154 and a conductor 156 can be determined by sequentially applying the test leads 158 of the test set, generally indicated as 160, to the possible combinations of conductors 154 and 156. As can be seen in the circuit diagram of FIG. 8, the test set 160 comprises a battery 162 connected in series with a bell 164 between the two test leads 158. When connected to an electrically interconnected pair of conductors 154, 156 as shown in FIG. 8, the circuit is completed between the test leads 158 and the bell rings.

Telephone systems present unique problems in the testing and identification of electrical cables. Telephone networks employ multi-conductor cables to interconnect remotely located telephone switching systems (such as that located at the central office) to other switching systems or subscriber equipment. The multi-conductor cables comprise a plurality of twisted wire pairs. A "pair" comprises the two wires that are used to connect the central office and subscriber equipment. One wire of a pair is referred to as the "tip" and the other as the "ring". Each pair of wires is bundled in groups of 25 or 100 pairs. Cables, in turn, may include as many as 3600 pairs. Cable is placed, whether aerial or underground, in sections. A typical 1200 pair cable reel length of 22 AWG gauge wire, with polyethylene conductor insulation, is 1250 feet in length. Splices are required throughout the cable network to connect such sections to one another and also to connect main cables with feeder and distribution cables of smaller cable pair count.

Until recently, the splicing (wire-joining) method commonly employed in the telephone industry involved splicing each individual pair by joining the tip wires, one to another, with discrete connectors, and the ring wires, one to another, each with a second discrete connector. Such a process is both time-consuming and expensive.

Recently, a method and associated hardware has been adopted in the telephone industry to perform the splicing operation through the joining of groups of pairs (in many cables, wire pairs are bundled in 25-pair groups). This is commonly referred to as "modular splicing".

Modular splicing equipment includes what is commonly referred at as a "cutter-presser" device in which a plastic module, comprising several parts, is employed. Examples of such splice modules are ones manufactured by the 3M Company, St. Paul, Minn. and sold under the name $MS^2$ module and one called the 710 Connector used in the Bell System (described in Bell System practice section 632-205-222, Issue 1, October, 1973). Individual wires are placed in identified slots in the module. When all of the wires are properly positioned in the module, the parts of the module are clamped to simultaneously provide electrical connection between appropriate wires and cut off the excess wire ends.

The presser device used in connection with the 710 Connector also includes means for providing electrical access to the wires in the module through test ports in the module body. An electrical connector on the cutter-presser equipment provides access to the 25 pairs spliced into the module. Various types of test sets could, therefore, be connected to the cutter-presser device for testing using the test ports and the electrical connector provided. Functionally similar access to the $MS^2$ module is also provided for connecting test equipment. While provision has thus been made for test equipment, to date, no test equipment is available for interfacing through the provisions thus provided to allow rapid and accurate testing of the type of cable splice which normally occurs in cable rearrangements using such apparatus.

There are many reasons for rearranging cables. For example, a section of cable may become faulty and need to be replaced. A cable route may have to be relocated due to a change in surface or underground conditions. Increased facilities over a particular cable route may be required from a certain point in the field to a more distant subscriber terminal equipment point. In many if not most, cable transfers, telephone operating companies attempt to make such transfer without interrupting service to the customer and often even perform the transfer while a voice conversation is being carried on the pair being physically respliced. To accomplish this without disruption or inconvenience to the customer imposes stringent limitations on what test apparatus can do in accomplishing its functions.

One type of transfer in which the cable test set of the present invention may be employed is shown as part of FIG. 1. In FIG. 1, there is shown an old cable (cable A) in which a section is to be replaced by a section of new cable (cable B). The new cable is spliced to the old cable at a first splice location using a bridge-tap or half-tap method, i.e. each wire in the old cable is tapped and a wire from a new cable is electrically connected in a "T" configuration. This bridge-tap or half-tap at the first splice location will not normally disturb a working line, even if in use, in normal voice communications. However, the critical phase of the transfer, which is normally referred to as "cut-closed" transfer, is where the free end of the new cable is now joined to the old cable at the second splice location. Unless the pairs are properly identified, and within each pair the proper polarity (ring-to-ring and tip-to-tip) are spliced, service will be interrupted. It is at this second splice location and for this identification and verification that the test apparatus of the present invention is to be used.

Additionally, the requirement for the inclusion of a battery, such as that employed in the "bell and battery" test set of FIGS. 7 and 8 is one which causes concern to users of such apparatus. Batteries are, typically, heavy and prone to give out at the moment of least convenience. Inasmuch as much of the previously discussed splicing and attendant testing is accomplished in locations which cannot easily be referred to as "convenient" (such as on raised poles and underground cable vaults), the elimination of a battery or other internal power supply for operation is a high priority design criteria.

Wherefore, it is the object of the present invention to provide a test set for accomplishing telephone cable splice testing and verification with apparatus requiring no internal power supply.

SUMMARY OF THE INVENTION

The test set of the present invention comprises a first terminal for connecting an electrical tone generating source to the test set; a second terminal for connecting the test set to the reference potential of the tone generating source (typically ground potential); switch means having a first input and an output for selectively connecting between the first input and the output, the first input being connected to the first terminal; a pair of matched coils connected on one end to the output of the switch means; first means connected to the other end of one of the coils for electrically contacting a first selected wire within an electrical cable; second means connected to the other end of the other of said coils for electrically contacting a second selected wire within an electrical cable; third means for electrically contacting a third selected wire within an electrical cable; fourth means for electrically contacting a fourth selected wire within an electrical cable; and, a pair of matched meter means connected respectively between the third electrical contacting means and the second terminal and between the fourth electrical contacting means and the second terminal for indicating the voltage thereacross. The aforementioned pair of meters comprise linear indicators mounted in side-by-side relationship reversed i.e. the maximum point of each meter is adjacent the minimum point of the opposite meter and the minimum point is opposite the maximum point, whereby the meter movements work in opposition to form a combined meter indicating pair display whereby the status of tip and ring pairs can be ascertained from the actions of the combined meter pair indicating display. In the preferred embodiment, the matched coils are bifilar windings on a single core and perform two functions. When sending tone, the matched coils present a high impedance to the customer's talking circuit so the conversation is not disturbed; simultaneously, the coils present a low impedance path to the identifying tone to assure a high level of signal being applied to the line. The second function performed by the matched coils is during use of the test set for verifying. In this mode of operation, the coils are used to provide a loop across the customer's line to lower the line voltage or seize the line in the case of an idle line. The low resistance of the coils is necessary to cause an adequate drop in the line voltage while providing a high impedance to the customer's talking circuit.

DESCRIPTION OF THE PREFERRED EMBODIMENT

Figure 1:
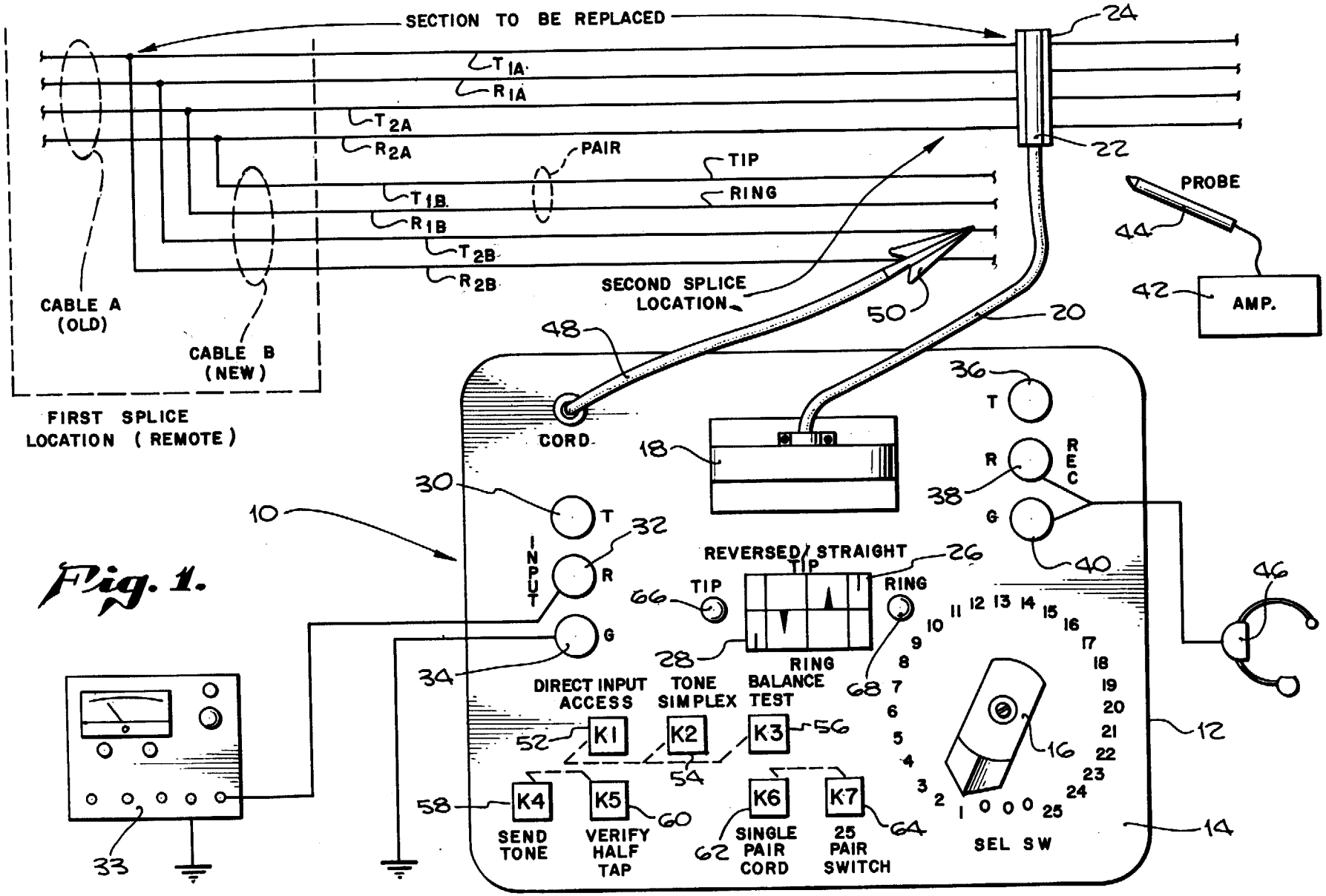
FIG. 1 is a simplified drawing of the test set of the present invention connected to test a section of cable being spliced.

Referring first to FIG. 1, the test set of the present invention, generally indicated as 10, is seen to be portable and housed in a suitable transit case 12 having a cover (not shown) which, when raised, exposes a faceplate 14 as shown. The faceplate 14 includes a rotary 25-pair selector switch 16 for accessing individual tip/ring wire pairs according to their position in a cutter-presser device. The individual pairs are connected to the test set 10 at a 50-pin connector 18, such as a Cinch-Jones connector commonly used for test sets in the telephone industry. The connector 18 is engaged by a 25-pair test cord 20 at one end; the cord 20 terminating at the other end in a connector 22 adapted for connecting to the cutter-presser device 24 which in turn provides electrical access to each wire of the 25-pair.

A pair of edgewise meters 26 and 28 (i.e. having indicating pointers moving along a straight line) are mounted in the faceplate. They are, respectively, a tip meter 26 and a ring meter 28. Further details of the meters 26, 28 will be discussed hereinafter.

Input binding posts T 30 and R 32 provide access points for connecting external input equipment, such as a tone source 33, to the tip (T) and ring (R) of the pair accessed by the selector switch 16. A third binding post, G 34, is used to ground the test set 10. "Ground" is the usual reference potential employed with all the equipment including the tone source 33. A second set of binding posts T 36, R 38, and G 40 provide output access points for connecting a tone receiving set such as an amplifier (not shown) or headset 46. A single pair cord 48, such as a B-transfer cord having a clip 50, is employed to provide manual electrical access to any particular wire pair.

In addition to the 25-pair selector switch 16 previously mentioned, faceplate 14 includes seven push-button switches, 52, 54, 56, 58, 60, 62 and 64 designated K1, K2, K3, K4, K5, K6, and K7 respectively. For ease of operator use, the seven push-buttons associated with switches 52-64 are also labeled on faceplate 14 as follows:

K1=DIRECT INPUT ACCESS
K2=TONE SIMPLEX
K3=BALANCE TEST
K4=SEND TONE
K5=VERIFY HALF TAP
K6=SINGLE PAIR CORD
K7=25-PAIR SWITCH

K1, K2, and K3 (52, 54, 56) are interlocking (as indicated by the dotted interconnections). That is, only one push-button can be operated at a time. Depressing one push-button releases either of the other two.

K4 and K5 (58, 60) are interlocking with K5 (60) having momentary action. That is, K5 (60) cannot be locked.

K6 and K7 (62, 64) are interlocking. When referring to the schematic drawings of FIGS. 3 and 6 to be discussed hereinafter, it will be noticed that push-button (switch) K6 (62) does not appear. When it is depressed it unlocks K7 (64). When K7 (64) is depressed, it locks, therefore, all contacts can be on one switch i.e. K7 (64).

It is to be understood that the use of the seven interlocking push-button switches 52-64 is a preferred matter of choice only. The interlocking action described provides a preferred action discouraging inadvertent operator errors. Other switch types could, of course, be employed without the interlocking action.

Figure 6:
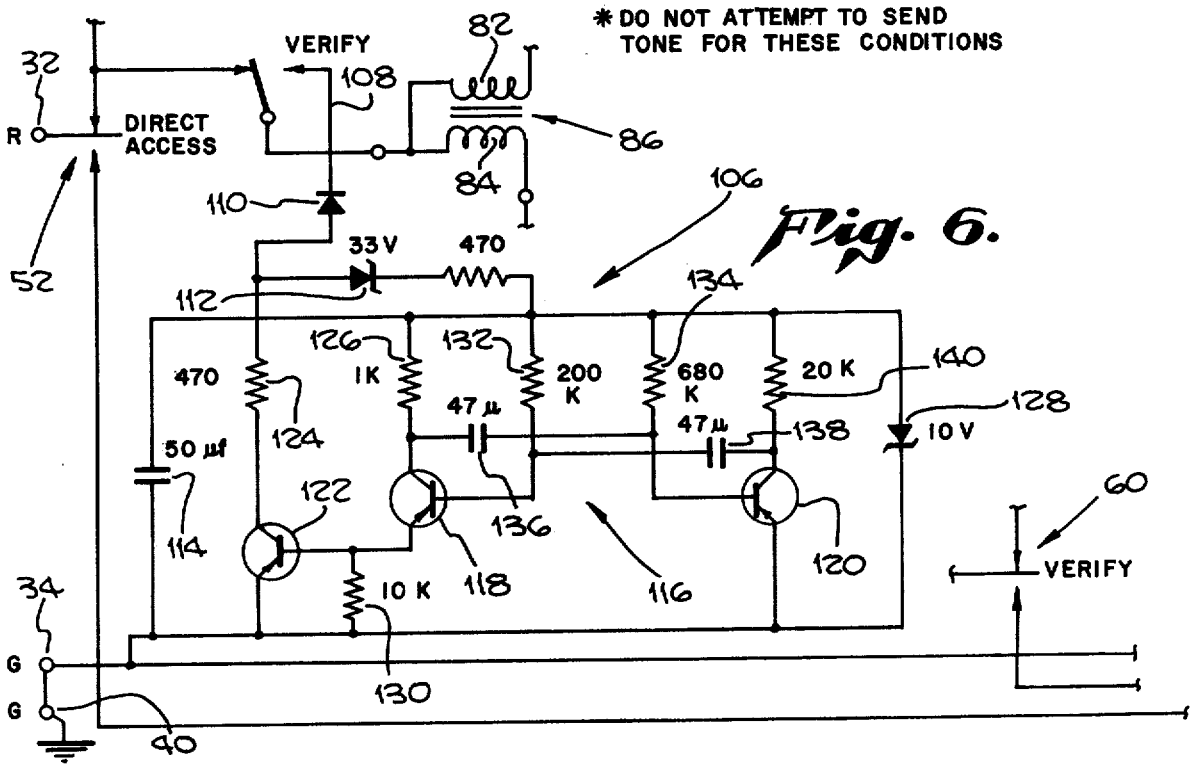
FIG. 6 is a schematic drawing of the novel automatic ground start circuit employed within the present invention (eliminated from the schematic drawing of FIG. 3 for clarity).
Figure 3:
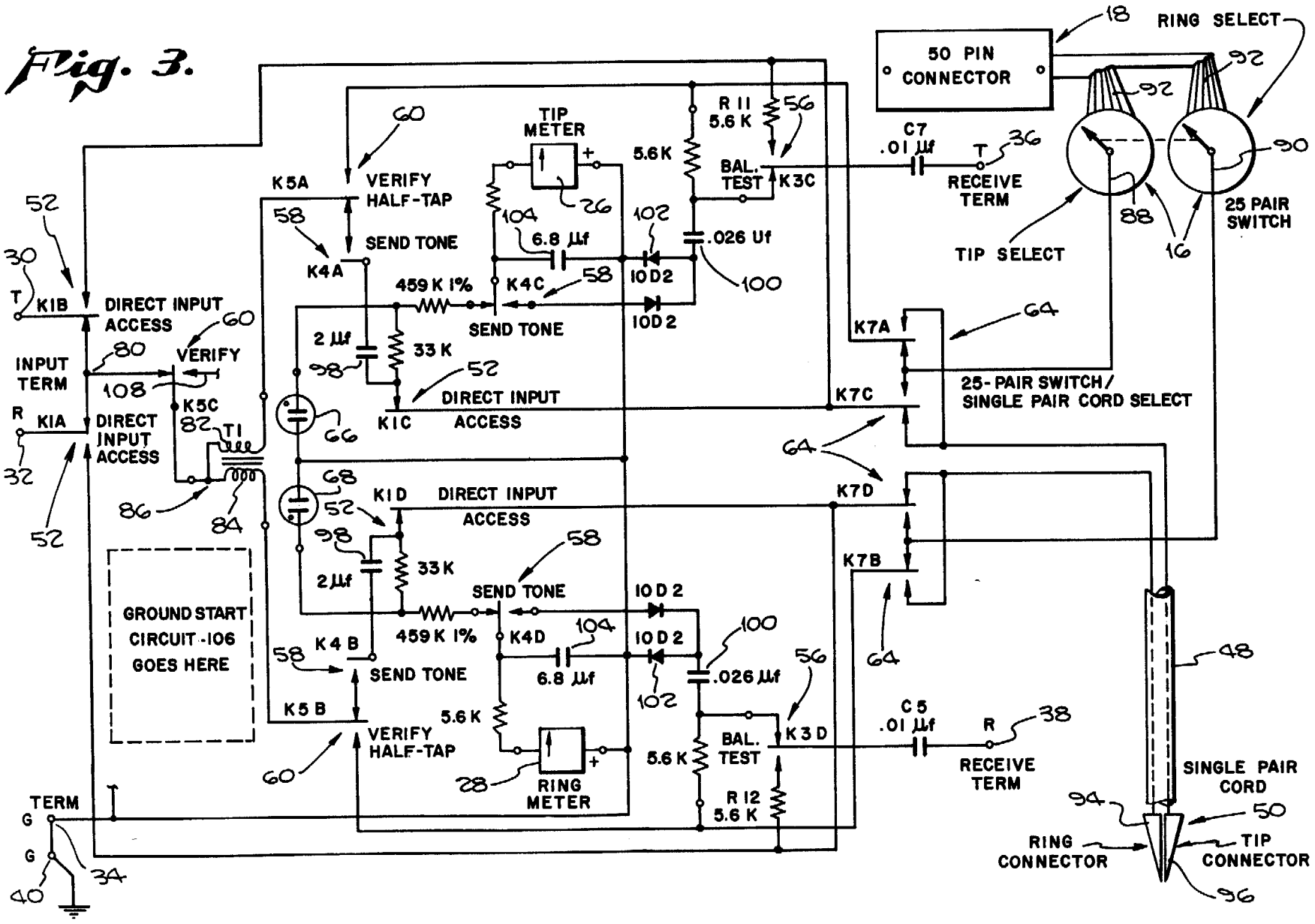
FIG. 3 is a schematic drawing of a tested embodiment of the test set of the present invention.
Figure 7:
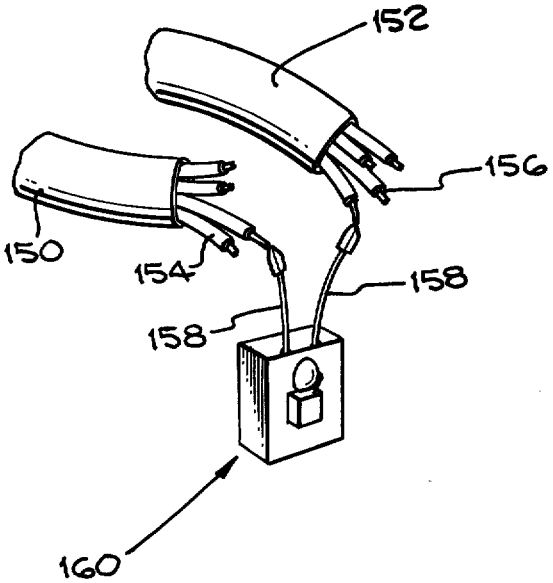
Fig. 7. PRIOR ART
FIG. 7 is a simplified drawing of a prior art bell and battery test set being employed to test two cables for shorted conductors therein.
Figure 8:
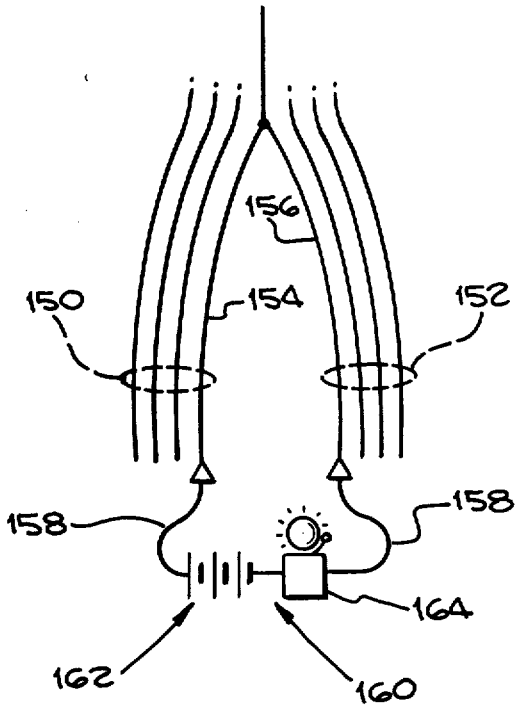
Fig. 8. PRIOR ART
FIG. 8 is a simplified circuit diagram of the apparatus of FIG. 7.

Note further that the push-button switches 52-64 employed provide up to four individual SPDT combinations on each switch, (designated A, B, C, and D). These appear on the schematic drawings to be described hereinafter as a suffix to the push-button identity, (i.e. K7B is a spring contact combination on push-button K7). All push-button switches 52-64 are shown in the schematics of FIGS. 3 and 6 in their off or unoperated positions.

The faceplate 14 also includes a pair of neon lamps 66, 68 to indicate when voltages in excess of 90 volts are present on the pair to which the test set 10 is connected.

As previously mentioned briefly, a diagrammatic representation of a cable transfer involving a section replacement is shown in FIG. 1. Cable A is shown as the "old" cable which can be assumed to be connected at the left end to the central office (not shown), passing through first and second splice locations (for example, manholes) and proceeding to the right to numerous subscribers (also not shown). Within cable A, there is shown two representative pairs 1 and 2, designated "pair 1A" comprising tip T1A and ring R1A, and "pair 2A" comprising T2A and R2A (tip and ring respectively). Cable A may contain hundreds of such pairs. In the process of replacing the old cable A section between the first and second splice locations, the "new" cable B if first bridge-tapped or half-tapped to cable A at the first splice location as shown. Cable B is also shown containing two respective pairs identified as "pair 1B" and "pair 2B". Pair 1B comprises tip and ring T1B and R1B respectively, and pair 2B comprises T2B and R2B.

At the second splice location, in order to complete the section replacement, cable B must be spliced into cable A. To do this, with the modular joining method, the cutter-presser modular splicing device 24 has been set up and it is assumed that 25 pairs, including pair 1A and pair 2A, have been placed into the cutter-presser head 24. Consequently, this 25-pair group is shown to be electrically connected to the test set 10 through the 25-pair cord 20 that connects the cutter-presser 24 to the connector 18 on the faceplate 14 of test set 10.

The two meters 26, 28 can now be connected to any one of the pairs in the 25-pair group of cable A by rotating switch 16 to the position number of the pair in the cutter-presser device 24. This allows the quick determination of the status of any pair, i.e. "working" (either "idle" (on-hook) or "in-use" (off hook)), or "dead" (vacant) as determined by the position of the meter pointers relative to suitably designated portions of the meter scale according to techniques to be described hereinafter. It also permits the determination of the polarity of each side of the selected pair so as to prevent a reversal.

By connecting an external tone source 33 between grounded G binding post 34 and ring (R) binding post 32 as shown in FIG. 1, the tone may be sent either via one of the pairs connected through switch 16 to the presser head 24 or via the single pair cord 48. Some telephone cables have each 25-pair groups segregated by a colored binder, as this simplifies locating an individual pair. If both the old and new cables have 25-pair identical binder groups and have been half-tapped without splitting groups, then the fastest method of identifying pairs is by sending tone on one pair of the new cable B via the single pair cord 48. This is accomplished by connecting the single pair cord 48 across one of the pairs in the selected binder group with the B-transfer clip 50, for example pair 2B as shown, and depressing single pair cord switch K6 62. This connects tip meter 26 between ground and side T2B of pair 2B and ring meter 28 between ground and side R2B. Meters 26 and 28 then indicate the status of pair 1B.

Figure 4:
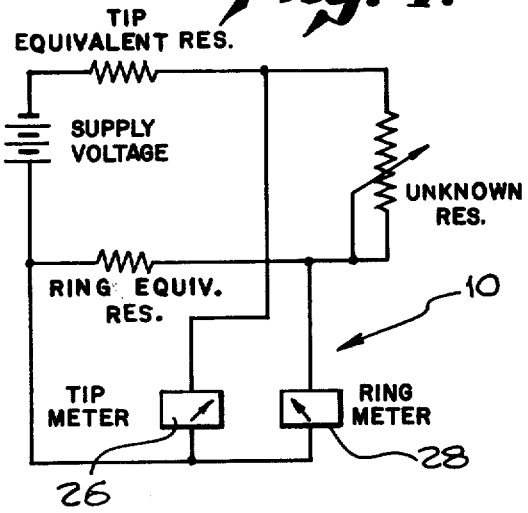
FIG. 4 is a simplified schematic drawing of the operation of the combined meter pair indicating display used in the present invention.
Figure 5:
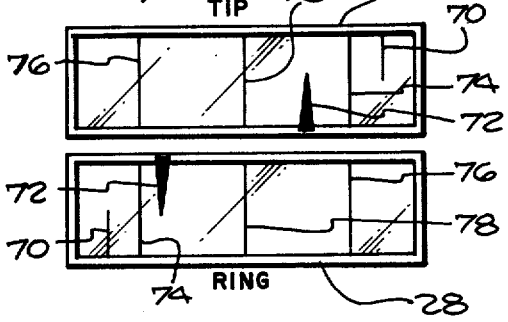
FIG. 5 is a detailed view of the meter pair indicating display of the present invention.
Figure 9:
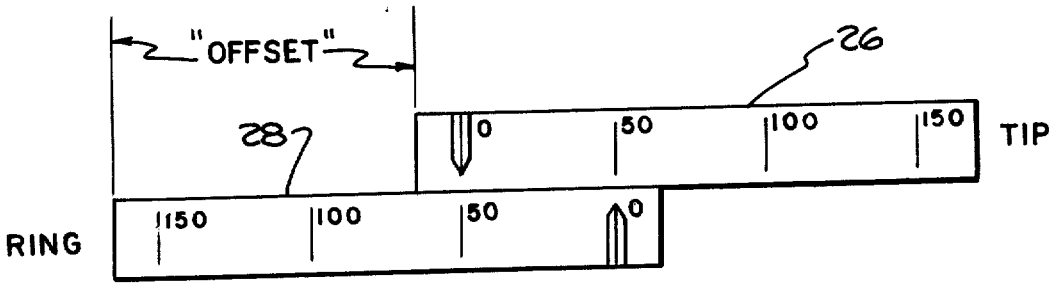
FIG. 9 is an optional configuration for the combined meter pair employed in the present invention.

One of the principal features of the test set 10 of the present invention is the use of the two meters 26 and 28, each of which is attached to one side of the pair being half-tapped, to indicate, in combination, the pair condition. The simplified circuit of FIG. 4 represents the test set 10, the Central Office battery (supply voltage), and the Tip and Ring conductor's equivalent resistance between the supply voltage and the point at which the pair is tapped (denominated as "Tip Equivalent Resistance" and "Ring Equivalent Resistance", respectively). For each telephone pair to which the test set is attached, there is additional resistance beyond the point at which the tap is made, which comprises the remaining resistance of the Tip and Ring and also the resistance of the subscriber's instrument (denominated as "Unknown Resistance"). The circuit further shows Tip meter 26 and Ring meter 28 tapped intermediate the Tip and Ring Equivalent Resistances and the Unknown Resistance. The meters thus indicate a voltage which is a function of the value of the Unknown Resistance. The total of the two readings (one on each meter) is equal to the supply voltage if, and only if, the Tip and Ring Equivalent Resistances are equal to each other, i.e. balanced. In a typical telephone circuit, the supply voltage provided by the Central Office battery is above 46 Volts and generally is equal to 50 Volts. The meters 26 and 28 preferably are edgewise meters placed closely adjacent to one another, as shown in FIG. 5, with the pointers moving in parallel straight-line paths. The meter scales are preferably identical with the zero graduation mark on one meter scale being directly opposite (aligned) the graduation mark equivalent to the supply voltage of the line that is normally employed in telephone circuits, for example 50 Volts. In the preferred configuration, the 50-Volt graduation line corresponds to the maximum reading on the meter scale and 0 corresponds to the minimum reading on the meter scale. However, it may be desirable in some cases to provide a meter scale which extends beyond the voltage graduation corresponding to the normal supply voltage of the line with the meter faces off-set as shown in FIG. 9 so that either meter may read beyond 50 Volts (for example, to indicate special circuits which may have a voltage of 150 Volts) so long as the supply voltage of the typical telephone circuit on one meter scale corresponds to the zero reading on the other meter scale, and vice versa. In the simplified circuit shown in FIG. 4, with the preferred meter arrangement of FIG. 5, it will be apparent that regardless of where the test set is tapped in the telephone pair, and therefore regardless of the "Unknown Resistance", the meter pointers will remain in line if the Tip and Ring Equivalent Resistances are equal. Such alignment further indicates the status of the line, i.e. "dead" (vacant) or "working" (idle or busy). Through the provision of suitable graduations on the meter scale, as will be explained hereinafter, the status of a working line as either "in use" (busy) or "idle" can also be determined. Finally, if the line is working, the pointers align themselves in a manner which indicates that the Tip and Ring at the point at which the tap is made are straight or reversed. A "reversal" occurs when a splice intermediate the Central Office and the point at which the tap is made is in error such that the Tip and Ring of the "Central Office" pair are attached to the Ring and Tip, respectively, of the "field side pair".

In the preferred configuration of meters 26, 28 of FIG. 5, the short line 70 on the face of the meters 26, 28 indicates the zero position for the moving pointer 72. The two full lines 74, 76 on either side of the meters 26, 28 (corresponding to 5 volts and 45 volts respectively) bound the area that the pointers 72 will move into when a line "in use" (busy line) is encountered. The full line 78 in the center of the meter indicates exact mid-scale (25 volts).

Figure 2:
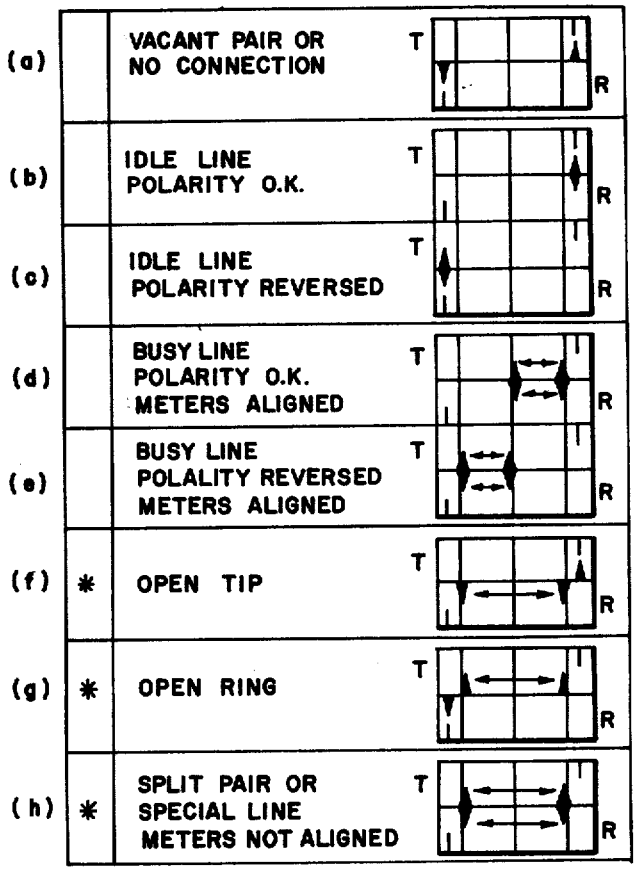
FIGS. 2(a)-(h) is a series of pictorial representations of various indications to be found when using the dual meter indicating display of the present invention and the tip/ring wire pair status associated with each such indication.

Referring now to FIG. 2, various indications are shown for the meters 26, 28 of FIG. 5 operating in combination as an indicating display. The meter indications in FIG. 2 apply only to readings encountered when the SEND TONE button (K4 58) is not operated (when the SEND TONE button is operated, the meters 26, 28 respond to tone returning through the half-tap connections). Briefly, the conditions shown in FIG. 2 are as follows:

FIG. 2(a)—A vacant pair or open connection is indicated by the absence of response of either meter.

FIG. 2(b)—An idle line is indicated when the ring meter pointer moves full scale to align with the tip meter pointer.

FIG. 2(c)—A reversed line is indicated when the tip meter pointer moves full scale to align with the ring meter pointer.

FIG. 2(d)—A line "in use" (busy line) is indicated when both meter pointers align with each other on the right side of the meters.

FIG. 2(e)—A reversed line "in use" (busy line) is indicated when both meter pointers align with each other on the left side of the meters.

FIG. 2(f)—An open tip is indicated when the ring meter pointer is in the "in use" (busy) area while the tip meter pointer has not moved.

FIG. 2(g)—An open ring is indicated when the tip meter pointer is in the "in use" (busy) area while the ring meter pointer has not moved.

FIG. 2(h)—A split pair or special circuit is indicated when both meter pointers move but fail to align with each other.

With the foregoing in mind and referring once again to FIG. 1, operation of the test set 10 of the present invention will be described briefly whereby the detailed schematic diagrams to be discussed hereinafter will become more readily apparent. Tagging and Verifying:

This procedure is recommended when the binder group counts on the old and new cables are identical, i.e. at the half-tap location all pairs in one group were joined to a second group of identical count. When group-for-group wire joining has been performed at the first location, the specific group which corresponds to the group being tested in the module can be located. It is, therefore, passible to send tones through the cord 48 connected to one of the pairs in the proper group in the non-terminated cable using the B-transfer clip 50 to permit identification of the corresponding pair in the group terminated in the module through the cutter-presser 24 via the connector 22 and cord 20. This method completely verifies the half-tap or bridge-tap made at the first location (whether at the central office or at a first splice location) for complete continuity as well as determining correct polarity. The steps of the procedure are as follows:

1. Make the connections shown in FIG. 1.
2. Depress the SINGLE PAIR CORD (K6 62) button. Depress the TONE SIMPLEX (K2 54) button. Momentarily depress the VERIFY HALF-TAP (K5 60) button to assure that the SEND TONE (K4 58) button is released.
3. Connect the B-transfer clip 50 to the cable pair in the cable group which was wire joined at the first half-tap location to the cable group terminated in the module of the cutter-presser device 24. The meters 26, 28 will indicate the status of connection and line condition according to the previously discussed states of FIG. 2.
4. If the conditions of FIGS. 2(a) through 2(e) are encountered, depress the SEND TONE (K4 58) button. This operation applies a simplex (inaudible) tone through the single pair cord 48 and B-transfer clip 50 into the pair.
5. Rotate the 25-pair switch 16, pausing briefly on each position until tone is received.
6. For vacant pairs (the condition of FIG. 2(a)), observe that both meters 26, 28 are responding to the tone. To verify polarity, depress the DIRECT INPUT ACCESS (K1 52) button. This applies tone on the ring side of the line only (as terminal R 32 is connected directly to terminal R 38) and only the ring meter 28 pointer 72 should respond. Prior to proceeding on to the next pair, depress the TONE SIMPLEX (K2 54) button to restore sending tone to both tip and ring. (This operation only applies when the vacant pairs have been half-tapped.)

For working pairs (the conditions of FIGS. 2(b) through 2(e), depress (and hold depressed) the VERIFY HALF-TAP (K5 60) button. The meter pointers 72 will be aligned with each other if the pair is not split. The VERIFY HALF-TAP (K5 60) button should then be released. The meter pointers 72 will move to a different position and remain aligned if a half-tap exists. Now depress the 25-PAIR SWITCH (K7 64) button. The meter pointers 72 should continue to indicate on the same side of the meters if the polarity is proper. If the meter pointers 72 move to the opposite side of the meters 26, 28, then the pair is reversed. To correct this, reverse the tip and ring when placing the non-terminated pair in the module of the cutter-presser device 24. Identifying special circuits:

Adjacent the tip and ring meters 26, 28 are two neon lamps 66, 68 for indicating the status of a pair in a special (higher voltage) circuit, e.g. generator pair (ringing signal source used with some PBX boards), burglar and fire alarms. One or both of the lights 66, 68 will be illuminated when such special working pairs have been encountered.

Known, inactive ground start circuits can be verified by temporarily shorting the ring (R) input binding post 32 to the ground (G) input binding post 34 while holding the VERIFY HALF-TAP (K5 60) button depressed. After the short is removed and with the VERIFY HALF-TAP (K5 60) button still depressed, the meter pointers 72 will align with each other if a proper half-tap exists. This will be discussed in greater detail hereinafter in relation to automatic ground start circuitry incorporated in one embodiment of the present invention. Verification:

This procedure is used when the new cable has been previously tagged. The steps are as follows:

1. Make connections as shown in FIG. 1. Depress the VERIFY HALF-TAP (K5 60) button to assure that the SEND TONE (K4 58) button is released.
2. Depress the 25-PAIR SWITCH (K7 64) button. Rotate the selector switch 16 to position 1. Attach the B-transfer clip 50 to pair 1 of the non-terminated cable.
3. Depress the TONE SIMPLEX (K2 54) button. If pair 1 is a good working pair (idle or in-use), the meter pointers 72 will align with each other as in FIGS. 2(b) through 2(e).
4. Depress the SINGLE PAIR CORD (K6 62) button. The meter pointers 72 will align (indicating conditions corresponding to FIG. 2(b) through 2(e)).
5. Depress the VERIFY HALF-TAP (K5 60) button. The meter pointers 72 will align (corresponding to conditions of FIGS. 2(b) through 2(e)). If the meter pointers 72 move but do not align, the pair is split (condition of FIG. 2(h)). If the meter pointers 72 do not move, no half-tap exists between the two pairs (FIG. 2(a)). If all meter readings in steps 3, 4 and 5 above are on the same half of the meter, i.e. on the right half (straight) or left half (reversed), the half-tap is proper and the pair is straight. If one of the three meter readings (steps 3, 4, and 5) are not on the same half of the meter as the other two readings, the pair is reversed. To correct, reverse the tip and ring before placing the non-terminated pair in the module of the cutter-presser device 24.
6. If pair 1 is a vacant pair, neither meter pointer 72 will respond (condition of FIG. 2(a)). Depress the SEND TONE (K4 58) button. Both meter pointers 72 should respond to tone. Depress the DIRECT INPUT ACCESS (K1 52) button to apply tone to only the ring. If only the ring meter 28 pointer 72 moves, polarity is proper. (Note, step 6 applies only if the vacant pair has been half-tapped).

Tagging:

This procedure is recommended if the pairs at the first half-tap location were not spliced binder-group-for-binder-group, i.e. a pair in one group at the first location was joined to a pair in a second group. In this method, tone is sent from the tone source, through the module of the cutter-presser device 24 via cord 20 and connector 22, and through the first half-tap location so that it may be searched for at the non-terminated cable end. All pairs in the cable may be tagged first and the verification method discussed above then used to prove out the half-tap and polarity. Alternatively, after each pair is tagged, the above discussed verification method may be used to prove out the half-tap and determine the polarity, i.e. verification of tagged pair at a time. Tagging is accomplished by the following steps:

1. Make the basic connections as shown in FIG. 1. (The headset 46 and the single pair cord 48 can be omitted).
2. Depress the 25-PAIR SWITCH (K7 64) button and the TONE SIMPLEX (K2 54) button, and momentarily depress the VERIFY HALF-TAP (K5 60) button to release the SEND TONE (K4 58) button.
3. Rotate the switch 16 to position 1 for pair 1.
4. If the meters 26, 28 indicate conditions corresponding to FIG. 2(a) through FIG. 2(e), depress the SEND TONE (K4 58) button. This operation applies simplexed (inaudible) tone to the pair selected through the rotary 25-pair switch 16.
5. Using the amplifier 42 and probe 44, locate the half-tapped pair by searching through the unterminated cable ends.
6. Repeat steps 3 through 5 above for positions 2 through 25 of the 25-pair switch 16.

Balance Testing:

This procedure provides a convenient way for balance testing the new cable count prior to having the heat coils placed by central office personnel. The procedure is as follows:

1. Make the basic connections as shown in FIG. 1 omitting the single pair cord 48. Note, use the headset 46 only, do not use an amplifier. Connect the headset 46 to the Ring (R) terminal 38 and the Tip (T) terminal 36.
2. Depress the BALANCE TEST (K3 56), SEND TONE (K4 58), and 25-PAIR SWITCH (K7 64) buttons. This operation applies simplex (inaudible) tone through the selector switch 16 to the pair under test.
3. Rotate the switch 16, pausing on each position to listen for the presence or absence of tone. Good balance pairs will produce a barely audible signal.
4. To verify for the absence of shorts, change the one connection of the headset 46 from the ring (R) terminal 38 to the Ground (G) terminal 40 and depress the DIRECT INPUT ACCESS (K1 52) button. This operation places tone on the ring side of the line only as previously discussed.
5. Rotate the selector switch 16. Any lines that are shorted will produce a tone in the headset 46.

Note that if the line is in use during any of the procedures described above, the subscriber is not disturbed by the application of the tone since it is nearly inaudible because of being applied simplex. Moreover, because the loop placed on the pair is a high-impedance, low-resistance short, it is also nearly inaudible to the subscriber. This will be discussed in greater detail in reference to the schematic diagrams of FIGS. 3 and 6 to be described hereinafter. If the line is idle when the loop is placed on the pair, the line relay at the central office is operated and the line assumes a balanced condition (if a proper identification of the "new" cable pair has been made) and is so indicated by the meters 26 and 28. If, rather than a normal home subscriber line, the line under test is connected to a pay station, or any ground start circuit, the test set 10 is adapted to recognize this type of line and automatically place a ground onto the pair so as to operate the line relay according to techniques to be described hereinafter.

An additional feature of the test set 10 of the present invention is that the meters 26 and 28 are also capable of being used to locate and/or verify the tone in lieu of using the headset 46 or an amplifier alone. This is possible because the meters 26, 28 are disconnected from the new cable pair and reconnected in series with capacitors to binding posts 34 and 36 (T and R) when the SEND TONE (K4 58) button is depressed i combination with the SINGLE PAIR CORD (K6 62) button. The meters 26 and 28 also have capacitors and diodes added in series (see FIG. 3 discussed hereinafter) so that they can respond to the tone and not to direct voltage as previously.

Referring now to FIG. 3, the schematic of a tested embodiment of the present invention is disclosed. Remembering the simplified drawing of FIG. 4, it should be readily apparent that the schematic of FIG. 3 represents two symmetrical circuits. This is proper inasmuch as each half of the circuit measuring one half of the "pair" under test with its associated meter 26, 28 must be matched (balanced) if it is to indicate imbalances in the lines of the pair under test. Thus, it will be noted that the input terminals 30 and 32 selectively connect to a common input point 80. One side of the C contacts of switch K5 60 is connected to the common point 80. The movable switch arm of the C contacts of switch K5 60 is connected to one side of a pair of matched coils. In the preferred embodiment, the coils comprise bifilar windings 82 and 84 of a transformer T1 generally indicated as 86. The other side of windings 82 and 84 are connected respectively through the A contacts and B contacts of switches K5 60 and K7 64 to the two wiper arms 88, 90 of rotary switch 16. The fifty output lines 92 from switch 16 are connected to the 50-pin connector 18 whereby fifty individual connections to the cutter-presser 24 can be affected through 25-pair test cord 20 attached thereto.

The other half of the circuit comprises a connection between the two connectors 94, 96 of the B-transfer clip 50 through the two meters 26, 28 respectively to the ground (G) terminal 34. This connection is selectively connectable as shown through switches K7 52, and K4 58, whereby the various tests hereinbefore described can be accomplished.

For example, in sending a tone as previously described, the tone source 33 is connected to input terminal R 32. The tone thus proceeds from terminal R 32 through the A contact of switch K1 52, through common point 80 and contact C of switch K5 60, to transformer T1 86 where it splits to pass through the two windings 82, 84; thence through the A and B contacts of switch K5 60 to the A and B contacts of switch K4 58. In the SEND TONE configuration, contacts A and B of switch K4 58 are closed allowing the tone to pass therethrough, through the capacitors 98, and from there through the C and D contacts of switch K1 52 and the C and D contacts of switch K7 64 to the connectors 94 and 96 of B-transfer clip 50, through which they are injected into the tip and ring of a selected pair. The tone, thus applied, passes through the selected pair, through the half-tap into the cable, back down the cable, where it is picked up through the 50-pin connector 18, passes into the appropriate output lines 92 of switch 16 and is picked up by the wiper arms 88, 90 thereof. The tone, thus received, passes through contacts A and B of switch K7 64 and thence through capacitors 100 and diodes 102 to meters 26 and 28 respectively; from whence it passes to the ground terminal 34 and thence to ground to complete the circuit.

The capacitors 100 in combination with diodes 102 provide the novel capability of the present invention, previously mentioned, wherein the meters 26, 28 can be used to detect a tone contrary to the usual procedure of the prior art wherein tones are only audibly detected. The capacitors 100 are inserted in series in the meter path to make the meters 26, 28 respond only to the varying audible tone and not direct current which may be on the line. The series diodes 102 are provided to discharge the capacitors 100. A capacitor 104 is placed in parallel across each meter 26, 28 to eliminate ripple. Note that the path to ground passes through the C and D contacts of switch K4 58 which also simultaneously disconnects the direct internal connection to the tone which would otherwise exist. Note also in this connection that the bifilar windings 82 and 84 act as high-impedance low-resistance elements within the path. The windings 82, 84 by providing a high impedance path minimize any change of voice level if the line is in use.

During the verifying procedure described above, the circuit, because of the switching, operates as two separate balanced circuits. Note that while the description hereinafter shows switch K7 64 in its single pair position (undepressed) the same test could be done in the 25-pair (depressed) position. This can be verified by tracing the circuitry through. A high impedance loop is placed across the pair being tested by employing the bifilar windings 82, 84 of transformer T1 86 in series. This loop goes from one wiper arm 88 of switch 16 through the A contact of switch K7 64, through the A contact of switch K5 60, through windings 82 and 84 in series, through contact B of switch K5 60 and contact B of switch K7 64 to the other wiper arm 90 of switch 16. From the wiper arms 88, 90, of course, the loop is connected across the tip and ring of the selected pair as previously described. The input (verifying) path exists between the two connectors 94 and 96, through contacts C and D of switch K7 64, through contacts C and D of switch K1 52, through contacts C and D of switch K4 58, and thence through the meters 26, 28 to ground via the terminal 34. Note that the neon lamps 66, 68 are respectively placed in parallel paths to receive the incoming signal before passing through the meters 26, 28 (being connected on the other side to the ground potential through the terminal 34) whereby high voltages will be sensed.

Referring now to FIG. 6 in combination with FIG. 3, additional circuitry is disclosed which operates in conjunction with the verifying test procedure, previously described, and which was omitted from the schematic diagram of FIG. 3 between the opposite side of the C contact of switch K5 60 and terminal 34 for purposes of keeping FIG. 3 simple and apparent in its symmetry. The ground start circuit, generally indicated as 106, is an optional item which is included in one embodiment of the present invention. The automatic ground start capability provided in the test apparatus 10 of the present invention by circuitry 106 can be accomplished manually by momentarily shorting the ring R input binding post 32 to the ground (G) binding post 34 or 40. Such approach is, of course, not preferred.

Ground start circuits are ones from which the ground normally present at the central office line equipment has been removed. This type of circuit requires a ground as well as a loop from the field to cause it to operate. Once operated, it will hold on the loop only. An example of a ground start circuit is a paystation. The presence of a proper coin condition (e.g. inserting a coin) causes a ground through a coin control relay to be placed on the line. Ground start circuitry 106 of the present invention automatically senses the absence of the central office ground and placed a ground on the line for purposes of testing. As will be noted, the ground start circuitry 106 can only be activated when the VERIFY HALF-TAP button 60 is depressed causing contact C of switch K5 60 to disconnect from the common input point 80 and connect to the line 108. Voltage to activate the ground start circuitry 106 enters line 108 and passes through a first diode 110 to a second diode 112. Diode 112 is a 33 volt zener diode. That is, it cannot conduct unless 33 volts or greater is present on the anode. Under normal conditions i.e. non-ground start circuits, the presence of the ground at the central office will cause the voltage at the anode of zener diode 112 to be half of the applied voltage, because the anode of zener diode 112 is applied to the line circuit at midpoint. However, if no ground is present, the voltage at zener diode 112 will be in excess of 33 volts and zener diode 112 will start charging capacitor 114 which is connected from the other side of zener diode 112 to ground via terminal 34. When capacitor 114 charges sufficiently, a multi-vibrator, generally indicated as 116 and including the transistors 118 and 120, commences switching back and forth. On the cycle that transistor 120 is "on", capacitor 114 can charge to a value approaching 10 volts. Then, when the cycle changes, transistor 118 forces transistor 122 (connected in series with a current limiting resistor 124 across the zener diode 112 to ground) "on", causing a low resistance ground to be placed from transistor 122 operated through resistor 124 and the load resistor 126 of transistor 118 and onto the line through one half of the coil (winding 82 or 84 of transformer 86). During this cycle, the voltage is reduced at the anode of zener diode 112 and zener diode 112 turns "off". The energy stored in capacitor 114, however, allows transistor 118 to maintain holding transistor 122 "on" for a period long enough to cause the line equipment in the central office to operate and return to ground. The two bifilar windings 82, 84 of transformer T1 86, thereafter act in series as the required "loop" to maintain the seizure when capacitor 114 discharges and allows transistors 118 and 122 to turn "off".

In the ground start circuitry 106 thus described, diode 110 is used to block the circuit from positive voltages. A second zener diode 128 is placed across the multi-vibrator 116 in parallel therewith to limit the circuitry to a maximum of 10 volts. Resistor 130 is connected from the source of transistor 118 to ground to insure that transistor 122 fully turns "off". Resistor 124 is a current limiting resistor which limits the current to transistor 122. Resistors 132 and 134 in combination with capacitors 136 and 138 provide the timing of multi-vibrator 116. Resistor 126, as previously described, as well as resistor 140 are merely load resistors for their respective transistor 118 and 120.

In addition to the specifically described circuits above, it will be noted that, for added flexibility, the preferred embodiment of the present invention, as shown in FIGS. 3 and 6, includes contacts of DIRECT ACCESS swith K1 52 which, when operated, provide a direct path between the input terminals T, R, and G (30, 32, 34) and the 25-pair switch 16 and the single pair cord 48 passing through the 25-pair switch selector 64 whereby the test set can bypass its internal circuitry and provide a selectable switch path between the inputs and outputs for use in connecting other external equipment to the pairs and the cutterpresser device 24.

Wherefore, having thus described my invention, I claim:

[1. In telephone cables having a pair of electrical conductors designated as Tip and Ring interconnecting powered equipment at one location with unpowered equipment at a second location, the unpowered test set for verifying the status of the Tip/Ring pair comprising:

(a) a low-resistance high-impedance circuit;

(b) means for selectively electrically connecting and disconnecting said low-resistance high-impedance circuit in parallel with the Tip/Ring pair whereby interference with normal operation of the equipment interconnected by the Tip/Ring pair during verification testing is prevented;

(c) a pair of matched circuits adapted for electrically connecting between the Tip conductor and ground potential and between the Ring conductor and ground potential respectively, each of said pair of matched circuits including one of a pair of matched voltage indicating meters respectively whereby the status of the Tip/Ring pair is indicated by the respective voltages with respect to ground potential; and, (d) means for electrically connecting said pair of matched circuits after said low-resistance high-impedance circuit has been electrically connected and for electrically disconnecting said pair of matched circuits before said low-resistance high-impedance circuit has been electrically disconnected.]

2. The test set of claim 1] *65*wherein:

(a) each of said pair of meters has a pointer which moves linearly between minimum and maximum indication points; and, (b) said meters are mounted close adjacent one another disposed to have said pointers move in parallel in opposite directions in response to positive voltage potentials and with the indication point corresponding to the voltage of the powered equipment of each of said meters adjacent the zero voltage point of the other of said meters whereby the combined movement of said pointers indicates the relational status of the Tip/Ring pair.

3. The test set of claim 1] *68* wherein:

said low-resistance high-impedance circuit comprises a pair of matched coils connected in series.

4. The test set of claim 3 wherein:

said matched coils are bifilar windings on a common core.

5. The test set of claim 3 and additionally comprising:

ground start circuit means connected between said pair of coils for selectively grounding the Tip and Ring conductors simultaneously through respective ones of said coils whereby ground start circuits contained in the powered equipment can be seized for verification testing.

6. The test set of claim 5 wherein:

said ground start circuit means includes means for sensing the voltage level between said coils and ground and for establishing said selective connection to ground potential for sufficient time to allow the ground start circuitry to respond and connect its own ground when said voltage level is above a preselected amount and for therafter connecting said coils in series across the Tip/Ring pair.

7. The test set of claim 6 wherein:

said establishing of said selective connection to ground potential is controlled by a multi-vibrator having one side thereof connected to control circuit means for selectively shorting connected between the midpoint between said coils and ground potential whereby a repeating momentary ground is established.

[8. In electrical cables comprising a plurality of insulated wires, a test set comprising:

(a) a first terminal for connecting an electrical tone generating source to the test set;

(b) a second terminal for connecting the test set to the reference potential of said tone generating source;

(c) switch means having a first input and an output for selectively connecting between said first input and said output, said first input being connected to said first terminal;

(d) a pair of matched coils connected on one end to said output of said switch means;

(e) first means connected to the other end of one of said coils for electrically contacting a first selected wire within an electrical cable;

(f) second means connected to the other end of the other of said coils for electrically contacting a second selected wire within an electrical cable;

(g) third means for electrically contacting a third selected wire within an electrical cable;

(h) fourth means for electrically contacting a fourth selected wire within an electrical cable; and, (i) a pair of matched meter means connected respectively between said third electrical contacting means and said second terminal and between said fourth electrical contacting means and said second terminal for indicating the voltage thereacross.]

9. The test set of claim [8] *65* wherein:

said pair of meter means each has a pointer which moves between its minimum and maximum indications points along a straight line path and said meters are mounted close adjacent one another with said straight line paths in parallel and with identical positive voltage indication points of each of said meters adjacent the zero voltage indication point of the other of said meters whereby a combined dual meter indicating display assembly is formed for indicating the relational status of pairs of wires in the electrical cables.

10. The test set of claim 9 wherein:

the fifty volt indication point on each meter is disposed opposite the zero volt indication point of the other meter.

[11. The test set of claim 8 wherein:

said pair of matched coils are bifilar windings on a common core.]

[12. The test set of claim 8 wherein:

(a) said switch means has a second input for connecting to said output when said first input is not connected to said output; and additionally comprising, (b) ground start circuit means connected between said terminal and said second input of said switch means for sensing the voltage level between said matched coils and ground and for grounding at least one side of the wire pair connected to the test set for testing through one of said coils until remote equipment connected to the wire pair can respond and connect its own ground when said voltage level is above a preselected amount and for thereafter connecting said coils in series across the wire pair connected to the test set as a high impedance loop.]

[13. The test set of claim 12 wherein:

said grounding one side of the connected pair is controlled by a multi-vibrator having one side thereof connected to control circuit means for selectively shorting connected between the common midpoint of said coils and ground whereby a repeating momentary ground is created.]

[14. The test set of claim 13 wherein:

said shorting circuit means includes a diode in series therewith to prevent the passage of positive voltages therethrough.]

[15. In electrical cable splicing apparatus wherein a plurality of electrical conductors of a first cable are tapped into respective ones of a plurality of electrical conductors of a second cable on one end of a first location and the apparatus has means for engaging the respective ones of the electrical conductors of the second cable at a second location remote from the first location, means for receiving the other end of the respective ones of the electrical conductors of the first cable, means for providing electrical contact to the respective ones of the electrical conductors of the second cable, and means for simultaneously tapping the other ends of the electrical conductors of the first cable into the electrical conductors of the second cable, the test apparatus for verifying the status of the two cables before said simultaneous tapping comprising:

(a) connector means for connecting to the means for providing electrical contact of the splicing apparatus whereby electrical contact can be made to the electrical conductors of the second cable individually;

(b) selector means having a plurality of inputs connected to said connector means to provide individual connections to the electrical conductors of the second cable and a pair of outputs for providing selectable connection from said outputs to a pair of electrical conductors in the second cable;

(c) a pair of contactor means for electrically contacting a pair of electrical conductors of the first cable;

(d) a first terminal for connecting to a reference potential;

(e) a pair of matched responsive meters;

(f) first circuit means for selectively connecting said pair of meters between respective ones of said pair of contactor means and said first terminal;

(g) a pair of matched coils connected together on one end in a common point; and, (h) second circuit means for selectively connecting one of said outputs of said selector means to the other end of one of said pair of coils and the other of said outputs of said selector means to the other end of the other of said pair of coils.]

[16. The test apparatus of claim 15 and additionally comprising:

third circuit means for selectively connecting said pair of meters between respective ones of said pair of outputs of said selector means and said first terminal, said third circuit means including a capacitor in series with each of said meters.]

[17. The test apparatus of claim 16 wherein:

said third circuit means includes a diode in series with each of said meters for discharging said capacitors.]

[18. The test apparatus of claim 15 and additionally comprising:

(a) a second terminal for connecting to an electrical tone source;

(b) fourth circuit means for selectively connecting said coils in series between said pair of contactor means; and, (c) fifth circuit means for selectively connecting said second terminal to said common point of said coils.]

[19. The test apparatus of claim 18 and additionally comprising:

first switch means connected to said first, second, third and fourth circuit means for connecting said first and second circuit means or said third and fourth circuit means in the alternative.]

[20. The test apparatus of claim 18 and additionally comprising:

said fifth circuit means including second switch means for connecting said fifth circuit means.]

[21. The test apparatus of claim 18 and additionally comprising:

sixth circuit means selectively connectable between said common point of said pair of coils and said first terminal for sensing the voltage level between said common point and said first terminal and for momentarily interconnecting said common point and said first terminal with a low resistance path when said voltage level is above a preselected level whereby remote equipment connected to the second cable is caused to connect a ground potential to a pair of electrical conductors electrically connected to said fourth circuit means and thereafter maintain said ground connecting due to said coils in series acting as a high impedance loop.]

[22. The test apparatus of claim 21 wherein:

said fifth and sixth circuit means are connected through a common switch whereby said sixth circuit means are connected when said fifth circuit means are disconnected and vice versa.]

[23. The test apparatus of claim 21 wherein said sixth circuit means includes:

(a) seventh circuit means having an input connected to said common point of said coils, an output connected to said first terminal, and a control input for causing said input and said output to be interconnected with a low resistance path;

(b) a multi-vibrator circuit connected on one side to said control input; and, (c) control circuit means connected to sense the voltage between said common point and said first terminal for starting said multi-vibrator into oscillation when said voltage is above said preselected level and for stopping said multi-vibrator when said voltage thereafter falls below a second preselected level.]

[24. The test apparatus of claim 23 wherein:

said control circuit means includes a diode in series with said sensing portion whereby said control circuit means does not respond to positive voltage potentials present.]

[25. The test apparatus of claim 15 wherein:

said pair of matched coils are bifilar windings on a common core.]

[26. The test apparatus of claim 15 wherein:

said pair of meters each has a pointer which moves between its minimum and maximum indication points along a straight line path and said meters are mounted close adjacent one another with said paths in parallel and with identical positive voltage indication points of each of said meters adjacent the zero voltage indication point of the other of said meters whereby a combined dual meter indicating display is formed for indicating the relational status of pairs of said electrical conductors in said cables.]

27. The test apparatus of claim [26] *78* wherein:

the fifty volt indication point on each meter is disposed opposite the zero volt indication point of the other meter.

28. In test apparatus for testing a pair of electrical conductors being a Tip wire and a Ring wire connecting a telephone central equipment center to remotely located equipment, the improvement comprising:

(a) an indicating assembly comprising a pair of matched voltage responsive meters each having a pointer which moves between its minimum and maximum indication points along a straight line path, said meters being mounted close adjacent one another with said straight line paths in parallel and with the 50 volt point of each of said meters adjacent the 0 volt point of the other of said meters; and, (b) a pair of matched first circuit means for selectively connecting respective ones of said meters of said indicating assembly between respective ones of the pair of electrical conductors (Tip and Ring) and ground potential whereby the operational status and balance condition of the pair of conductors can be determined by the combined movement of of said pointers.

29. The test apparatus of claim 28 wherein:

said pointers each move adjacent a scale having indicia thereon indicating when said meter is responding to potentials of 0 volts, 5 volts, 25 volts,and 45 volts whereby voltage zones corresponding to conditions of common Tip and Ring pairs are created for interpretation by an operator from the positional relationship of said pointers relative to said zones.

30. The test apparatus of claim 28 and additionally comprising:

a pair of matched second circuit means for selectively connecting respective ones of said meters of said indicating assembly between respective ones of the pair of electrical conductors (Tip and Ring) and ground potential in a manner such that said meters are responsive only to electrical tone frequency voltages and not direct current voltages whereby the presence of a tone signal on either of the conductors of the pair injected thereon at a remote location can be detected visually with one of said meters.

[31. The test apparatus of claim 30 and additionally comprising:

a pair of matched third circuit means for connecting to a source of an electrical tone frequency signal and for selectively applying said tone frequency signal equally to the Tip and Ring wire of an electrical conductor pair contained within a plurality of such pairs comprising a telephone cable at a location remote from said second circuit means whereby the Tip and Ring pair having said signal applied thereto can be identified from the remaining Tip and Ring pairs in the telephone cable at the location of said second circuit means by detecting said tone signal through said second circuit means and said indicating assembly.]

[32. The test apparatus of claim 31 and additionally comprising:

switch means electrically connected between said second circuit means and the plurality of Tip and Ring wire pairs comprising said telephone cable for selectively connecting said second circuit means to a particular Tip and Ring wire pair.]

[33. The test apparatus of claim 32 wherein:

said switch means includes means for connecting to said telephone cable through a cutter-presser splicing device including positional designations associated with each of said pairs connected to said device and further including indicia corresponding to said positional designations and means for selecting the pair being connected in relation to said indicia whereby selected pairs in said cutter-presser splicing device can be tested.]

[34. The test apparatus of claim 28 and additionally comprising:

(a) a pair of matched high-impedance low-resistance coils connected together on one end in a common point; and, (b) a pair of matched third circuit means for selectively connecting the other end of one of said coils to the Tip wire and the other end of the other of said coils to the Ring wire whereby ground start equipment at the central equipment center is maintained in an active state and interference with equipment using the pair is eliminated during testing of the Tip/Ring wire pair.]

[35. The test apparatus of claim 34 and additionally comprising:

ground start circuit means for selectably connecting said common point of said coils to ground potential to activate inactive ground start equipment at the central equipment center connected to the Tip/Ring wire pair being tested.]

[36. The test apparatus of claim 35 wherein:

said ground start circuit means includes means for automatically grounding said common point when the potential thereof is in exess of 33 volts.]

[37. The test apparatus of claim 35 wherein:

said ground start circuit means includes an oscillator for controlling said grounding whereby said grounding is only continuous for the duration of one half-cycle of the oscillator.]

[38. The test apparatus of claim 37 wherein:

said ground start circuit means is adapted to turn said oscillator on when the potential at said common point exceeds 33 volts and to turn said oscillator off when said potential falls below 33 volts signifying activation of the ground start equipment.]

[39. The method of verifying the status of a Tip/Ring electrical conductor pair of a telephone cable interconnecting Central Office equipment of a known voltage potential to remote equipment supplying no voltage comprising the steps of:

(a) electrically interconnecting the Tip/Ring pair with a low-resistance high-impedance circuit to prevent interference with normal operation of the Tip/Ring pair;

(b) measuring the voltage to ground of the Tip conductor while the Tip/Ring pair is thus interconnected;

(c) measuring the voltage to ground of the Ring conductor while the Tip/Ring pair is thus interconnected;

(d) comparing the voltages obtained in steps (b) and (c) to preselected values whereby the status of the Tip/Ring pair is determined; and, (e) electrically disconnecting the interconnection from step (a).]

[40. The method of claim 39 wherein:

said step of electrically interconnecting the Tip/Ring pair is accomplished by placing a pair of series connected matched coils in parallel connection with the Tip and Ring conductors; and additionally comprising the step immediately following step (a) of claim 39 of, (a1) momentarily electrically connecting the midpoint between said coils to ground to seize ground activated equipment at the Central Office for verification testing.]

41. The method of claim [39] *79* wherein step (d) of comparing the Tip and Ring voltages includes the steps of:

(d1) indicating a vacant pair if both the Tip and Ring voltages are zero;

(d2) indicating an idle pair of proper polarity if the Tip voltage is zero and the Ring voltage is equal to the known voltage of the Central Office equipment;

(d3) indicating an idle pair of reversed polarity if the Tip voltage is equal to the known voltage of the Central Office equipment and the Ring voltage is equal to zero;

(d4) indicating an in-use pair of proper polarity if neither voltage is zero, the Tip voltage is less than half the known voltage of the Central Office equipment, and the sum of the Tip and Ring voltages is equal to the known voltage of the Central Office equipment;

(d5) indicating an in-use pair of reversed polarity if neither voltage is zero, the Ring voltage is less than half the known voltage of the Central Office equipment, and the sum of the Tip and Ring voltages is equal to the known voltage of the Central Office equipment;

(d6) indicating an open Tip connector if the Tip voltage is zero and the Ring voltage is greater than zero and less than the known voltage of the Central Office equipment;

(d7) indicating an open Ring connector if the Ring voltage is zero and the Tip voltage is greater than zero and less than the known voltage of the Central Office equipment; and, (d8) indicating that the Tip and Ring are a split pair or a special line operating at a voltage other than the known Central Office equipment voltage being used for comparison herein if neither the Tip or Ring voltage is zero and the sum of the Tip and Ring voltages is not equal to the known voltage of the Central Office equipment.

[42. The method of claim 39 wherein step (d) of comparing the Tip and Ring voltages includes the steps of:

(d1) displaying the voltage to ground of the Tip conductor on one of the matched set of voltage indicating meter movements including a pointer moving in relation to the applied voltage, said meters being disposed in parallel relationship with the pointers thereof moving in opposite directions for equal voltages;

(d2) displaying the voltage to ground of the Ring conductor on the other of said meter movements;

(d3) indicating a balanced line if the two meter pointers are aligned; and, (d4) indicating an unbalanced line if the two meter pointers are not aligned.] .

[43. The method of claim 42 and, when step (d4) thereof indicates an unbalanced line, additionally comprising the step of;

(d5) comparing the amount of disalignment of the meter pointers to pre-established amounts to determine thereby if the line is "in use", "idle", or "reversed" as a function of said amount of disalignment.]

[44. In a telephone cable having a first Tip/Ring electrical conductor pair interconnecting Central Office equipment of a known voltage potential to remote equipment supplying no voltage and a second Tip/Ring electrical conductor pair half-tapped on one end into the first Tip/Ring pair at a first splice location, the method of verifying the status and polarity of the first and second Tip/Ring pairs at a second splice location prior to tapping the other end of the second Tip/Ring pair into the first Tip/Ring pair, comprising the steps of:

(a) electrically interconnecting the first Tip/Ring pair with a low-resistance high-impedance circuit to prevent interference with normal operation of the equipment interconnected by the first Tip Ring pair;

(b) measuring the voltage to ground of the second Tip conductor while the Tip/Ring pair is thus interconnected to establish the voltage of one of the first conductors through the second Tip conductor;

(c) measuring the voltage to ground of the second Ring conductor while the Tip/Ring pair is thus interconnected to establish the voltage of the other of the first conductors through the second Ring conductor;

(d) comparing the voltages obtained in steps (b) and (c) to preselected values whereby the status of the Tip/Ring pair is determined; and, (e) electrically disconnecting the interconnection from step (a).]

[45. The method of claim 44 and additionally comprising the steps of:

(e) directly measuring the voltage to ground of the first Tip conductor at the second splice location;

(f) directly measuring the voltage to ground of the first Ring conductor at the second splice location; and, (g) comparing the first Tip and Ring voltages measured to the second Tip and Ring voltages measured whereby proper Tip to Tip and Ring to Ring pairing for tapping is indicated by corresponding voltages.]

[46. The method of claim 44 wherein:

said step of electrically interconnecting the Tip/Ring pair is accomplished by placing a pair of series connected matched coils in parallel connection with the first Tip and Ring conductors; and additionally comprising the steps immediately following step (c) of claim 42 of, (c1) if the sum of the voltages measured in steps (b) and (c) is less than 33 volts, continuing to step (d) of claim 42; otherwise, (c2) momentarily electrically connecting the midpoint between said coils to ground to seize ground activated equipment at the Central Office and returning to step (b) of claim 42.]

47. The method of claim [44] *80* wherein step (d) of comparing the Tip and Ring voltages includes the steps of:

(d1) indicating the second Tip/Ring pair is not connected to the first Tip/Ring pair or the first Tip/Ring pair is vacant if both the Tip and Ring voltages are zero;

(d2) indicating the first Tip/Ring pair is an idle pair and polarity is proper if the Tip voltage is zero and the Ring voltage is equal to the known voltage of the Central Office equipment;

(d3) indicating the first Tip/Ring pair is an idle pair and the second Tip and Ring conductors are reversed polarity if the Tip voltage is equal to the known voltage of the Central Office equipment and the Ring voltage is equal to zero;

(d4) indicating the first Tip/Ring pair is an in-use pair and polarity is proper if neither voltage is zero, the Tip voltage is less than half the known voltage of the Central Office equipment, and the sum of the Tip and Ring voltages is equal to the known voltage of the Central Office equipment;

(d5) indicating the first Tip/Ring pair is an in-use pair and the second Tip and Ring conductors are of reversed polarity if neither voltage is zero, the Ring voltage is less than half the known voltage of the Central Office equipment, and the sum of the Tip and Ring voltages is equal to the known voltage of the Central Office equipment;

(d6) indicating an open second Tip connection into the first pair if the Tip voltage is zero and the Ring voltage is greater than zero and less than the known voltage of the Central Office equipment;

(d7) indicating an open second Ring connection into the first pair if the Ring voltage is zero and the Tip voltage is greater than zero and less than the known voltage of the Central Office equipment; and, (d8) indicating that the second Tip and Ring are a split pair of the first Tip/Ring pair is a special line operating at a voltage other than the known Central Office equipment voltage being used for comparison herein if neither the Tip or Ring voltage is zero and the sum of the Tip and Ring voltages is not equal to the known voltage of the Central Office equipment.

[48. A test set for verification testing of Tip/Ring conductor pairs in telephone cables being spliced comprising:

a pair of matched circuits for simultaneously electrically connecting between the Tip connector and ground potential and between the Ring conductor and ground potential respectively, each of said pair of matched circuits including one of a pair of matched voltage indicating meters respectively whereby the status of the Tip/Ring pair is indicated by the relationship of the respective simultaneous voltages with respect to ground potential.]

49. The method of verification testing of Tip/Ring conductor pairs in telephone cables being spliced comprising the steps of:

(a) simultaneously measuring the voltage to ground potential of the Tip conductor and the Ring conductor respectively;

(b) indicating a vacant pair if both the Tip and Ring voltages are zero;

(c) indicating an idle pair of proper polarity if the Tip voltage is zero and the Ring voltage is equal to the known voltage of the Central Office equipment;

(d) indicating an idle pair of reversed polarity if the Tip voltage is equal to the known voltage of the Central Office equipment and the Ring voltage is equal to zero;

(e) indicating an in-use pair of proper polarity if neither voltage is zero, the Tip voltage is less than half the known voltage of the Central Office equipment, and the sum of the Tip and Ring voltages is equal to the known voltage of the Central Office equipment;

(f) indicating an in-use pair of reversed polarity if neither voltage is zero, the Ring voltage is less than half the known voltage of the Central Office equipment, and the sum of the Tip and Ring voltages is equal to the known voltage of the Central Office equipment;

(g) indicating an open Tip connector if the Tip voltage is zero and the Ring voltage is greater than zero and less than the known voltage of the Central Office equipment;

(h) indicating an open Ring connector if the Ring voltage is zero and the Tip voltage is greater than zero and less than the known voltage of the Central Office equipment; and, (i) indicating that the Tip and Ring are a split pair or a special line operating at a voltage other than the known Central Office equipment voltage being used for comparison herein if neither the Tip or Ring voltage is zero and the sum of the Tip and Ring voltages is not equal to the known voltage of the Central Office equipment.

*50. In the splicing of telephone cables connected between a central office and remote equipment wherein a new tip/ring conductor pair is first half-tapped on one end into an old tip/ring conductor pair, the method of verifying the continuity of the new tip/ring pair on its other end prior to tapping the new and old pairs together on the other end comprising the steps of:*

*(a) electrically accessing the old tip and ring conductors and the new tip and ring conductors of the respective pairs at the other end; and,*

*(b) comparing the voltage potentials of the new tip/ring pair appearing at the other end to the voltage potentials of the old tip/ring pair and indicating the new tip/ring pair as probably a valid counterpart of the old tip/ring pair if the sums of the voltage potentials on the new and old tip/ring pairs are equal and reflect the central office potential.*

*51. The method of claim 50 wherein:*

*said step of comparing the voltage potentials of the new tip/ring pair to the voltage potentials of the old tip/ring pair comprises measuring the voltage potentials of the tip and ring conductors in each case by simultaneously connecting them to respective ones of a pair of linear voltage meters each having its zero point aligned with the point equal to the central office potential on the other meter whereby when the indicators of the meters are aligned, the sum of the two potentials is equal to the central office potential.*

*52. The method of claim 50 and additionally comprising the steps of:*

*(c) applying a disturbance across one of the tip/ring pairs in a balanced manner which will not interfere with an active conversation on the line; and,*

*(d) simultaneously sensing the effect of the balanced disturbance on the other tip/ring pair and indicating the new tip/ring pair as a valid counterpart of the old tip/ring pair if the balanced disturbance produced a balanced effect.*

*53. The method of claim 52 wherein:*

*said step of applying a balanced disturbance comprises electrically connecting a low-resistance, high-impedance circuit across the one tip/ring pair.*

*54. The method of claim 53 wherein:*

*(a) said step of comparing the voltage potentials of the new and old tip/ring pairs comprises obtaining the respective potentials to ground of the tip and ring conductors of each tip/ring pair, summing the two potentials thus obtained in each case and comparing the sums; and,*

*(b) said step of sensing the effect comprises obtaining the respective potentials to ground of the tip and ring conductors of the other tip/ring pair, summing the two potentials thus obtained, and comparing the sum to the central office potential wherein said effect is balanced if the individual voltages change but their sum is and continues to be equal to the central office potential.*

*55. The method of claim 52 wherein:*

*(a) said step of applying a balanced disturbance comprises electrically connecting a simplexed tone generating source to the one tip/ring pair so as to introduce simplexed tone into the conductors thereof; and,*

*(b) said step of sensing the effect comprises simultaneously sensing for the presence of the tone signal on the tip and ring conductors of the other pair wherein said effect is balanced if the tip and ring conductors of the other pair each have the same level of tone present thereon.*

*56. The method of claim 55 wherein:*

*said step of simultaneously sensing for the presence of tone comprises simultaneously measuring the A.C. potential of the conductors of the other tip/ring pair.*

*57. In the splicing of telephone cables connected between a central office and remote equipment wherein a new tip/ring conductor pair is first half-tapped on one end into an old tip/ring conductor pair, the method of verifying the continuity of the new tip/ring conductor pair on its other end prior to tapping the new and old pairs together on the other end comprising the steps of:*

*(a) electrically accessing the old tip and ring conductors and the new tip and ring conductors to obtain their voltage potentials To, Ro, Tn, and Rn, respectively; and,*

*(b) comparing the voltage potentials thus obtained and indicating the new tip/ring pair as probably a valid counterpart of the old tip/ring pair if the relationship*

$$R_o + To - (Rn + Tn) = 0$$

*is satisfied.*

*58. The method of claim 57 wherein said step of comparing the voltage potential comprises:*

*(a) measuring the voltage potentials of the tip and ring conductors in each case by simultaneously connecting them to respective ones of a pair of linear voltage meters each having its zero point aligned with the point equal to the central office potential on the other meter so that the aligning of the meters' indicators indicates that the sum of the tip and ring conductors connected thereto is equal to the central office potential; and,*

(b) accepting the relationship $$Ro+To-(Rn+Tn)=0$$

as satisfied if in each case the indicators are aligned and the indicators are in substantially the same position.

59. The method of claim 57 and additionally comprising the steps of:

(c) applying a disturbance across one of the tip/ring pairs in a balanced manner which will not interfere with an active conversation on the line; and, (d) simultaneously sensing the effect of the balanced disturbance on the other tip/ring pair and indicating the new tip/ring pair as a valid counterpart of the old tip/ring pair if the balanced disturbance produced a balanced effect.

60. The method of claim 59 wherein:

said step of applying a balanced disturbance comprises electrically connecting a low-resistance, high-impedance circuit across the one tip/ring pair.

61. The method of claim 60 wherein:

(a) said step of comparing the voltage potentials of the new and old tip/ring pairs comprises obtaining the respective potentials to ground of the tip and ring conductors of each tip/ring pair, summing the two potentials thus obtained in each case, and comparing the sums; and, (b) said step of sensing the effect comprises obtaining the respective potentials to ground of the tip and ring conductors of the other tip/ring pair, summing the two potentials thus obtained, and comparing the sum to the central office potential wherein said effect is balanced if the individual voltages change but their sum is and continues to be equal to the central office potential.

62. The method of claim 59 wherein:

(a) said step of applying a balanced disturbance comprises electrically connecting a simplexed tone generating source across the one tip/ring pair so as to introduce simplexed tone into the conductors thereof; and, (b) said step of sensing the effect comprises simultaneously sensing for the presence of the tone signal on the tip and ring conductors of the other pair wherein said effect is balanced if the tip and ring conductors of the other pair each have the same level of tone present thereon.

63. The method of claim 62 wherein:

said step of simultaneously sensing for the presence of tone comprises simultaneously measuring the A.C. potential of the conductors of the other tip/ring pair.

64. In the splicing of telephone cables connected between a central office and remote equipment wherein a new tip/ring conductor pair is first half-tapped on one end into an old tip/ring conductor pair, apparatus for verifying the continuity of the new tip/ring conductor pair on the other end prior to tapping the new and old pairs together on the other end comprising:

(a) means for electrically accessing the old tip and ring conductors and the new tip and ring conductors of the respective pairs at the other end; and, (b) means for comparing the simultaneous voltage potentials of the new tip/ring pair appearing at the other end to the simultaneous voltage potentials of the old tip/ring pair whereby the new tip/ring pair is indicated as probably a valid counterpart of the old tip/ring pair if the sums of the voltage potentials on the new and old tip/ring pairs are equal and reflect the central office potential.

65. The apparatus of claim 64 wherein:

said means for comparing the simultaneous voltage potentials of the new tip/ring appearing at the other end to the simultaneous voltage potential of the old tip/ring comprises a pair of voltage indicating circuits.

66. The apparatus of claim 65 wherein:

said pair of voltage indicating circuits includes a pair of matched linear voltage meters adapted for measuring the voltage potentials of the tip and ring conductors in each case simultaneously, each of said meters having its zero point aligned with the point equal to the central office potential on the other meter whereby when the indicators of the meters are aligned, the sum of the two potentials is equal to the central office potential.

67. The apparatus of claim 65 and additionally comprising:

(c) means for applying a disturbance across one of the tip/ring pairs in a balanced manner which will not interfere with an active conversation on the line; and, (d) means for simultaneously sensing the effect of the balanced disturbance on the other tip/ring pair whereby the new tip/ring pair is indicated as a valid counterpart of the old tip/ring pair if the balanced disturbance produced a balanced effect.

68. The apparatus of claim 67 wherein:

said means for applying a balanced disturbance comprises a low-resistance, high-impedance circuit adapted to be connected across the conductors of a tip/ring pair.

69. The apparatus of claim 68 wherein:

(a) said means for comparing the voltage potentials of the new and old tip/ring pairs comprises means for obtaining the respective potentials to ground of the tip and ring conductors of each tip/ring pair, for summing the two potentials thus obtained in each case, and for comparing the sums; and, (b) said means for sensing the effect comprises means for obtaining the respective potentials to ground of the tip and ring conductors of the other tip/ring pair, for summing the two potentials thus obtained, and for comparing the sum to the central office potential wherein said effect is balanced if the individual voltages change but their sum is and continues to be equal to the central office potential.

70. In the splicing of telephone cables connected between a central office and remote equipment wherein a new tip/ring conductor pair is first half-tapped on one end into an old tip/ring conductor pair, apparatus for verifying the continuity of the new tip/ring conductor pair on the other end prior to tapping the new and old pairs together on the other end comprising:

(a) means for electrically accessing the old tip and ring conductors and the new tip and ring conductors of the respective pairs at the other end; and, (b) means for comparing the simultaneous voltage potentials of the new tip/ring pair appearing at the other end to the simultaneous voltage potentials of the old tip/ring pair such that the new tip/ring pair is indicated as probably a valid counterpart of the old tip/ring pair if the relationship $$Ring(old)+Tip(old)-(Ring(new)-Tip(new))=0$$

is satisfied.

71. The apparatus of claim 70 wherein:

said means for comparing the simultaneous voltage potentials of the new tip/ring pair appearing at the other end to the simultaneous voltage potential of the

*old tip/ring pair comprises a pair of voltage indicating circuits.*

*72. The apparatus of claim 71 wherein:*

*said means for comparing the voltage potentials of the new tip/ring pair to the voltage potentials of the old tip/ring pair comprises a pair of linear voltage meters adapted for measuring the voltage potentials of the tip and ring conductors in each case simultaneously, each of said meters having its zero point aligned with the point equal to the central office potential on the other meter whereby when the indicators of the meters are aligned, the sum of the two potentials is equal to the central office potential.*

*73. The apparatus of claim 70 and additionally comprising:*

*(c) means for applying a disturbance across one of the tip/ring pairs in a balanced manner which will not interfere with an active conversation on the line; and,*

*(d) means for simultaneously sensing the effect of the balanced disturbance on the other tip/ring pair whereby the new tip/ring pair is indicated as a valid counterpart of the old tip/ring pair if the balanced disturbance produced a balanced effect.*

*74. The apparatus of claim 73 wherein:*

*said means for applying a balanced disturbance comprises a low-resistance, high-impedance circuit adapted to be connected across the conductors of a tip/ring pair.*

*75. The apparatus of claim 73 wherein:*

*(a) said means for comparing the voltage potentials of the new and old tip/ring pairs comprises means for obtaining the respective potentials to ground of the tip and ring conductors of each tip/ring pair, for summing the two potentials thus obtained in each case, and for comparing the sums; and,*

*(b) said means for sensing the effect comprises means for obtaining the respective potentials to ground of the tip and ring conductors of the other tip/ring pair, for summing the two potentials thus obtained, and for comparing the sum to the central office potential wherein said effect is balanced if the individual voltages change but their sum is and continues to be equal to the central office potential.*

*76. In electrical cable splicing apparatus wherein a plurality of electrical conductors of a first cable are tapped into respective ones of a plurality of electrical conductors of a second cable on one end at a first location and the apparatus has means for engaging the respective ones of the electrical conductors of the second cable at a second location remote from the first location, means for receiving the other end of the respective ones of the electrical conductors of the first cable, means for providing electrical contact to the respective ones of the electrical conductors of the second cable, and means for simultaneously tapping the other ends of the electrical conductors of the first cable into the electrical conductors of the second cable, the test apparatus for verifying the status of the two cables before said simultaneous tapping comprising:*

*(a) connector means for connecting to the means for providing electrical contact of the splicing apparatus whereby electrical contact can be made to the electrical conductors of the second cable individually;*

*(b) selector means having a plurality of inputs connected to said connector means to provide individual connections to the electrical conductors of the second cable and a pair of outputs for providing selectable connection from said outputs to a pair of electrical conductors in the second cable;*

*(c) a pair of contactor means for electrically contacting a pair of electrical conductors of the first cable;*

*(d) a first terminal for connecting to a reference potential;*

*(e) a pair of matched voltage responsive meters;*

*(f) first circuit means for selectively connecting said pair of meters between respective ones of said pair of contactor means and said first terminal;*

*(g) a pair of matched coils connected together on one end in a common point; and*

*(h) second circuit means for selectively connecting one of said outputs of said selector means to the other end of one of said pair of coils and the other of said outputs of said selector means to the other end of the other of said pair of coils.*

*77. The test apparatus of claim 76 and additionally comprising:*

*third circuit means for selectively connecting said pair of meters between respective ones of said pair of outputs of said selector means and said first terminal, said third circuit means including a capacitor in series with each of said meters.*

*78. The test apparatus of claim 76 wherein:*

*said pair of meters each has a pointer which moves between its minimum and maximum indication points along a straight line path and said meters are mounted close adjacent one another with said paths in parallel and with identical positive voltage indication points of each of said meters adjacent the zero voltage indication point of the other of said meters whereby a combined dual meter indicating display is formed for indicating the relational status of pairs of said electrical conductors in said cables.*

*79. The method of verifying the status of a Tip/Ring electrical conductor pair of a telephone cable interconnecting Central Office equipment of a known voltage potential to remote equipment supplying no voltage comprising the steps of:*

*(a) electrically interconnecting the Tip/Ring pair with a low-resistance high-impedance circuit to prevent interference with normal operation of the Tip/Ring pair;*

*(b) measuring the voltage of the Tip conductor while the Tip/Ring pair is thus interconnected;*

*(c) measuring the voltage of the Ring conductor while the Tip/Ring pair is thus interconnected;*

*(d) comparing the voltages obtained in steps (b) and (c) to preselected values whereby the status of the Tip/Ring pair is determined; and,*

*(e) electrically disconnecting the interconnection from step (a).*

*80. In a telephone cable having a first Tip/Ring electrical conductor pair interconnecting Central Office equipment of a known voltage potential to remote equipment supplying no voltage and a second Tip/Ring electrical conductor pair half-tapped on one end into the first Tip/Ring pair at a first splice location, the method of verifying the status and polarity of the first and second Tip/Ring pairs at a second splice location prior to tapping the other end of the second Tip/Ring pair into the first Tip/Ring pair, comprising the steps of:*

*(a) electrically interconnecting the first Tip/Ring pair with a low-resistance high-impedance circuit to prevent interference with normal operation of the equipment interconnected by the first Tip/Ring pair;*

*(b) measuring the voltage to ground of the second Tip conductor while the Tip/Ring pair is thus interconnected to establish the voltage of one of the first conductors through the second Tip conductor;*

*(c) measuring the voltage to ground of the second Ring conductor while the Tip/Ring pair is thus interconnected to establish the voltage of the other of the first conductors through the second Ring conductor;*

*(d) comparing the voltages obtained in steps (b) and (c) to preselected values whereby the status of the Tip/Ring pair is determined; and,*

*electrically disconnecting the interconnection from step (a).*

*81. The method of claim 80 and additionally comprising the steps of:*

*(e) directly measuring the voltage to ground of the first Tip conductor at the second splice location;*

*(f) directly measuring the voltage to ground of the first Ring conductor at the second splice location; and,*

*(g) comparing the first Tip and Ring voltages measured to the second Tip and Ring voltages measured whereby proper Tip to Tip and Ring to Ring pairing for tapping is indicated by corresponding voltages.*

*82. The method of claim 80 wherein:*

*said step of electrically interconnecting the Tip/Ring pair is accomplished by placing a pair of series connected matched coils in parallel connection with the first Tip and Ring conductors; and additonally comprising the steps immediately following step (c) of claim 80 of:*

*(c1) if the sum of the voltages measured in steps (b) and (c) is less than 33 volts, continuing to step (d) of claim 80, otherwise,*

*(c2) momentarily electrically connecting the midpoint between said coils to ground to seize ground activated equipment at the Central Office and returning to step (b) of claim 80.*

*83. A test set for verification testing of Tip/Ring conductor pairs in telephone cables being spliced comprising:*

*a pair of matched circuits for simultaneously electrically connecting between the Tip connector and ground potential and between the Ring conductor and ground potential respectively, each of said pair of matched circuits including one of a pair of matched voltage indicating meters respectively whereby the status of the Tip/Ring pair is indicated by the relationship of the respective simultaneous voltages with respect to ground potential.*

* * * * *